Sept. 30, 1952 H. R. WARREN 2,612,595
ADJUSTABLE ELECTRODE ASSEMBLY FOR HIGH-FREQUENCY HEATING SYSTEMS
Filed Feb. 12, 1948 3 Sheets-Sheet 1

INVENTOR.
HENRY R. WARREN
BY
Woodcock and Phelan
ATTORNEYS

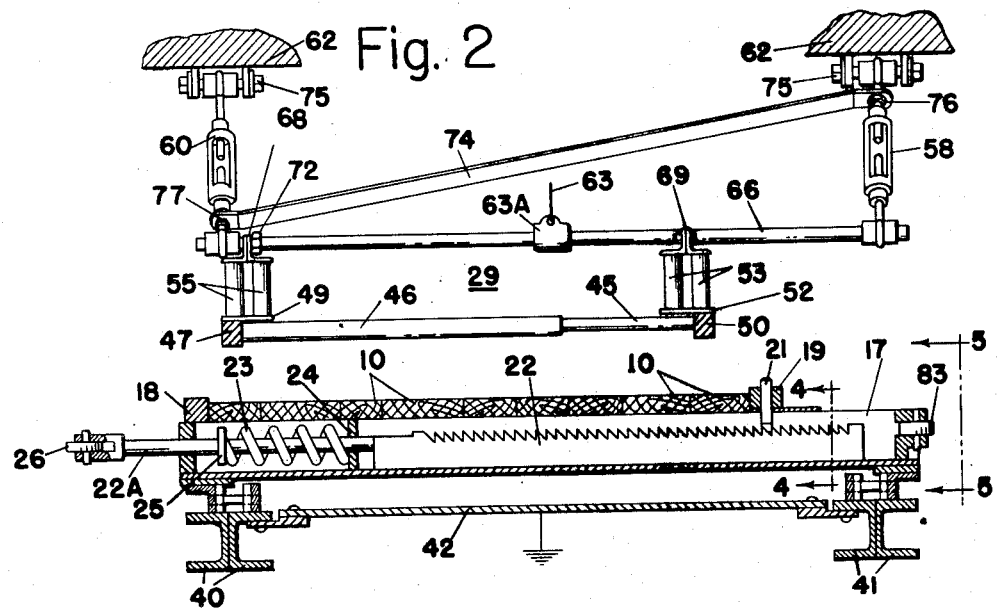
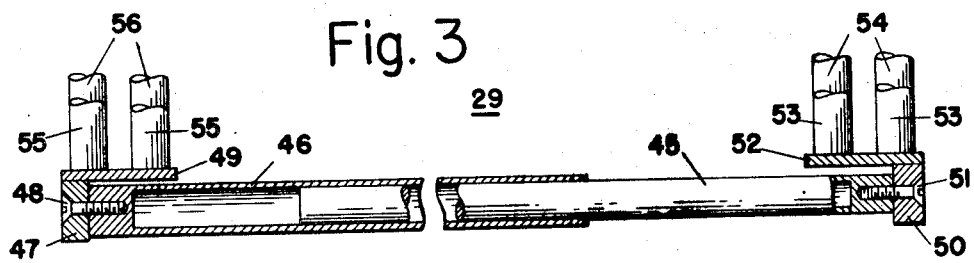
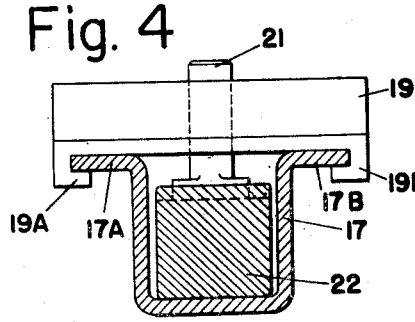
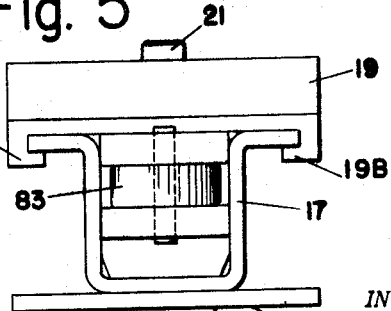
INVENTOR.
HENRY R. WARREN
BY
Woodcock and Phelan
ATTORNEYS

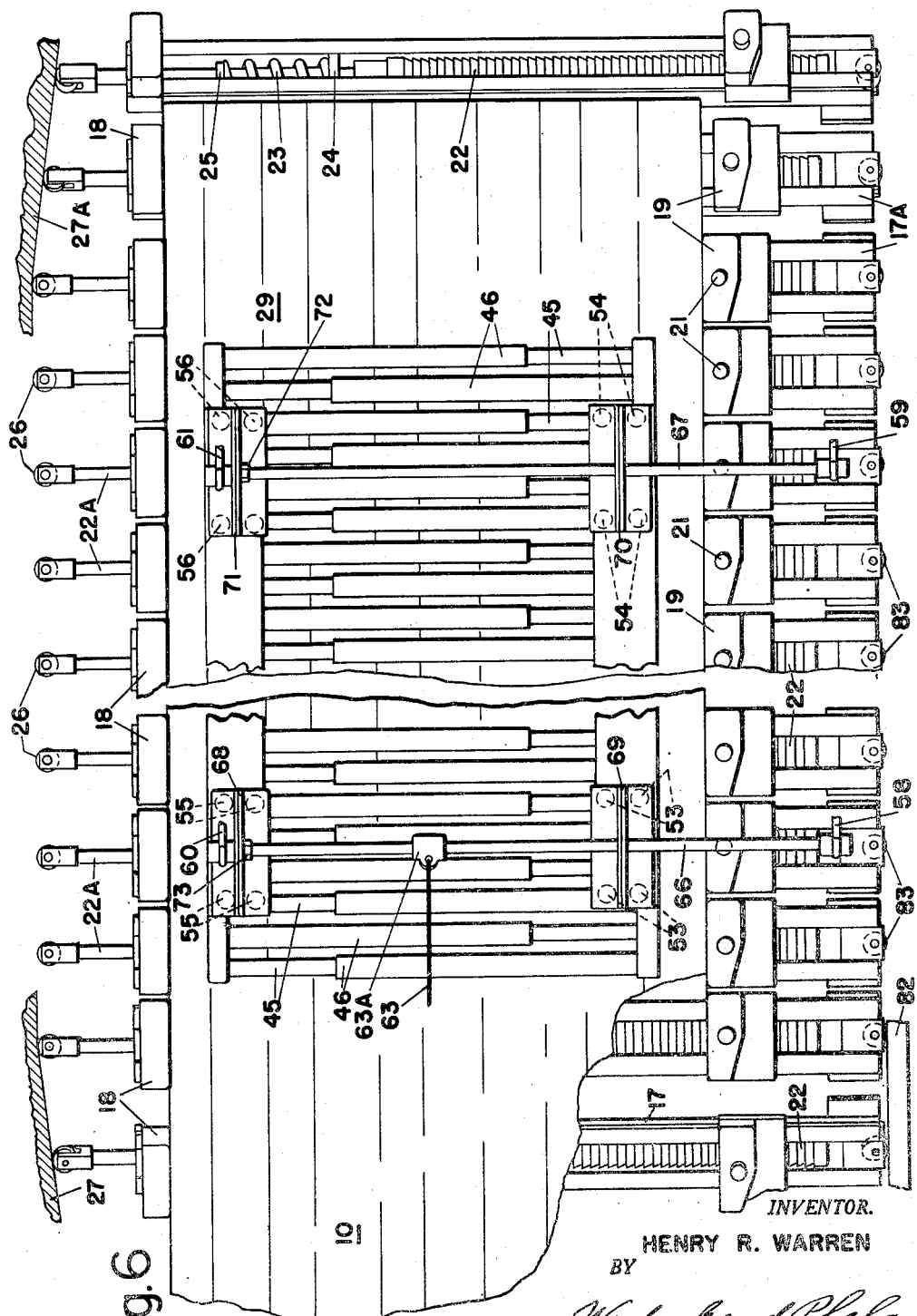

Patented Sept. 30, 1952

2,612,595

UNITED STATES PATENT OFFICE 2,612,595

ADJUSTABLE ELECTRODE ASSEMBLY FOR HIGH-FREQUENCY HEATING SYSTEMS

Henry R. Warren, Louisville, Ky., assignor to The Girdler Corporation, Louisville, Ky., a corporation of Delaware Application February 12, 1948, Serial No. 7,888

18 Claims. (Cl. 219—47)

This invention relates to high-frequency heating systems, more particularly to systems wherein work is continuously moved between two heating electrodes, and has for an object the provision of means for adjusting one electrode relative to the other and for varying the size of one electrode to accommodate work which from time to time may be of widely differing area.

In woodworking systems it is frequently necessary to glue together a plurality of pieces of wood to form a member of relatively large cross-sectional area or width. Such edge gluing has heretofore been conducted in presses where the individual pieces of wood have been laid side by side after application of a suitable adhesive, and pressure applied to hold the adhesively coated edges firmly together. The drying time for such an assembly is considerable, and while the glue is setting the apparatus cannot be used for other work.

To avoid having a press occupied for such a length of time as is required for the bonding material to harden, set or dry, high-frequency heating systems have been used to produce a strong firm bond in a very short time. The wood with bonding material suitably applied thereto is moved continuously between heating electrodes. In such presses as heretofore used for edge bonding, no provisions have been made to accommodate widely differing numbers of pieces to produce final products of widely differing width.

In carrying out the present invention in one form thereof, there is disposed above the grounded bedplate of the press a heating electrode which is suspended for movement toward and away from the bedplate of the press. The electrode itself comprises two sets of heating elements disposed in telescoping relation and conducting members arranged to support the free ends of the elements whereby one set of elements may be moved toward or away from the other set of elements to adjust the effective area of the electrode in relation to the area or width of the work. More particularly, the electrode is preferably suspended by a plurality of links which maintain the electrode parallel to the bedplate rolls for any angular position of the links and for all spacings of the electrode above the work. A cord of insulating material or other suitable means is utilized to swing the electrode about its supporting links in adjustment of the capacity between the electrode and the bedplate and to prevent overloading of the associated high-frequency oscillator. In many cases it is exceedingly inconvenient for a workman to move from one side of a press to the other, in part at least, because of the large size of such presses. In order that all operations may be performed from one side of the press, the suspension means includes trusses which form triangular structures for holding stationary one side of the electrode member when the other conducting member is moved to adjust the telescoping elements to provide an electrode area which is best suited to the area of work then being operated upon.

For a more detailed disclosure of the invention and for further objects and advantages thereof, reference should now be had to the following description taken in conjunction with the accompanying drawings, in which:

Fig. 1 diagrammatically illustrates in side elevation an embodiment of the invention applied to a conveyor-type press;

Fig. 2 is a sectional view of Fig. 1 taken on the line 2—2 thereof;

Fig. 3 is an enlarged sectional view taken on the line 3—3 of Fig. 1;

Fig. 4 is a sectional view taken on the line 4—4 of Fig. 2;

Fig. 5 is an end view of one of the channel members of Fig. 2 as indicated by the line 5—5; and Fig. 6 is a fractional plan view of Fig. 1 taken just below the suspension links.

Figure 1:
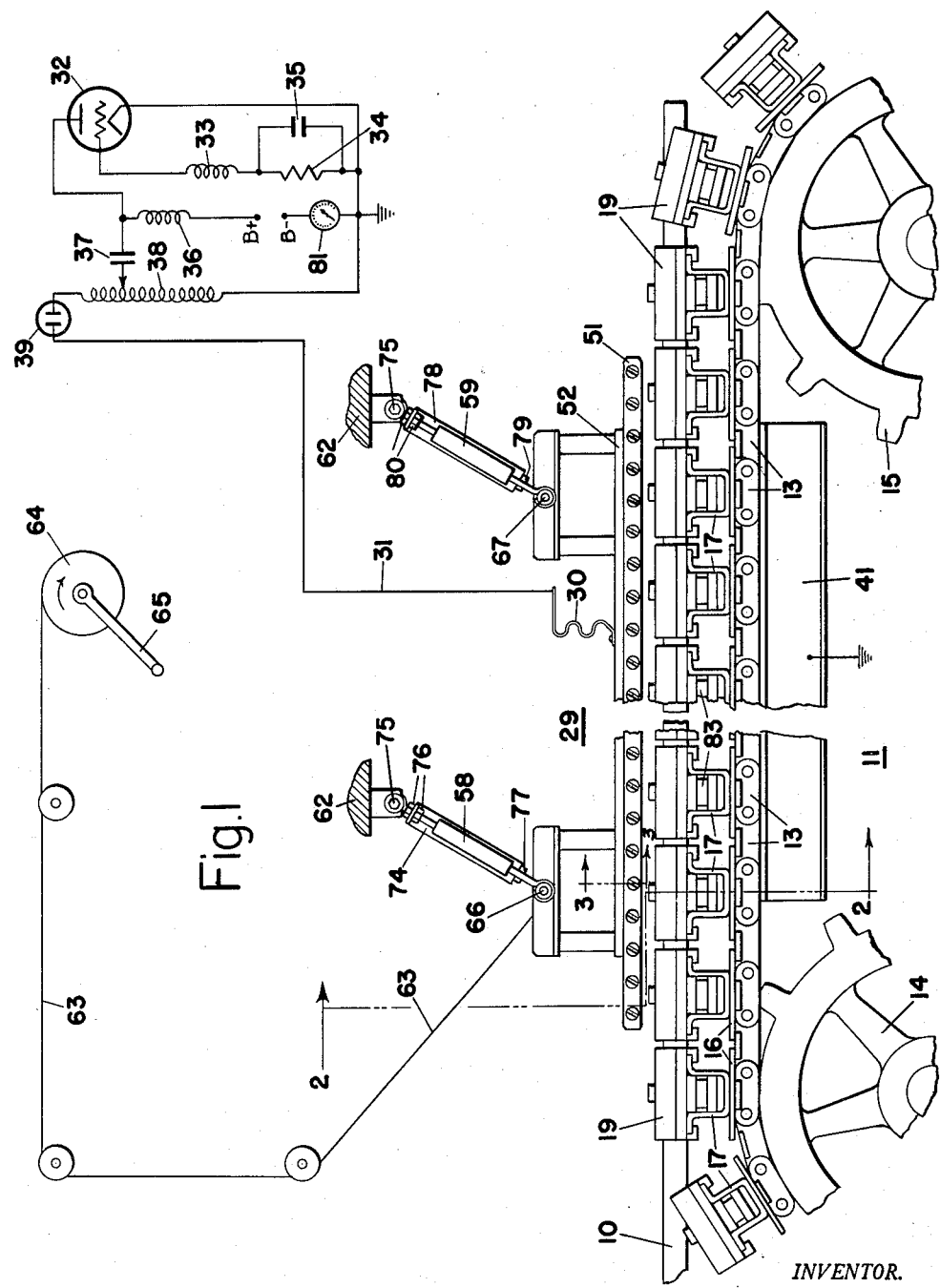

Referring to the drawings, the invention in one form is shown as applied to the adhesive bonding of a plurality of lengths of wood 10 supported on a conveyor 11. The conveyor itself includes chains 12 having a plurality of driving links 13 driven by sprocket wheels 14 and 15. To every other driving link there is attached supporting plates 16. Secured to the supporting plates are a plurality of channel-shaped members 17 having the sides thereof turned outwardly. The work comprising the lengths of wood rests upon the flat, out-turned ends of channel members 17. It will be seen from Fig. 2 that the edges of a substantial number of adhesively coated boards may be laid side by side on the channel-shaped members 17. The lengths of wood of any selected thickness and width are clamped and held tightly together between stationary stops 18 and relatively adjustable stops 19. Each adjustable stop 19, Fig. 4, is slidably mounted on the outwardly extending arms 17-A and 17-B of its associated channel-shaped member 17, overlapping ends 19-A and 19-B being provided to hold the adjustable stops 19 on the channel 17. Each adjustable stop 19 carries a latch pin 21 which is gravity-biased into engagement with the teeth of a rack 22 which is biased by a spring 23 to apply a compressional force on the wood or work 10 firmly to hold the adhesively coated edges together.

More specifically, one end of the spring bears against a plate 24 welded or otherwise secured to its associated channel 17, while the other end of the spring bears against a thrust member 25 secured to a round projection or extension 22-A of the rack 22. The extension 22-A has bifurcated arms in which is pivotally supported a roller 26. The roller 26 is arranged to cooperate with a cam surface 27, Fig. 6, to move each stop away from the adjacent board 10. In adjusting the stops for an assembly of boards of different total width, each of pins 21 will be lifted and each stop 19 suitably positioned on its channel 17. The pins will then be released for movement into engagement with its rack 22. While boards are being placed in position, the racks and each stop 19 will be moved by cam 27-A away from stops 18 and then released, as shown in Fig. 6, for application of the force of the spring 23 to the boards to hold them tightly together and against the stationary stops 18.

Quickly to set or harden or dry the adhesive, high-frequency electrical energy is applied to the clamped boards or work 10. An upper, adjustable electrode 29 is connected by a flexible conductor 30 and a conductor 31 into, and forms a part of, the output circuit of a high-frequency generator which includes a vacuum tube 32. The high-frequency oscillator includes a grid coil or inductor 33, a grid resistor 34 and by-pass condenser 35, a source of anode supply indicated by B-plus and B-minus. Included in the anode circuit is a high-frequency choke coil 36, a blocking capacitor 37 being connected between the anode and the tank coil or inductor 38. The conductor 31 is connected by way of a vacuum condenser 39 to the upper end of the tank coil 38, while the lower end thereof is connected to ground and to the cathode of the tube 32. A substantial part of the capacitance of the tank circuit appears between the adjustable electrode 29 and ground. Preferably, the conveyor 11 as a whole is grounded. To insure that the conveyor remains at substantially ground potential it is desirable to include between conveyor supporting channels or I-beams 40 and 41 a plate 42, Fig. 2, connected to ground and in length and breadth substantially corresponding with the length and breadth of the supporting channels beneath the adjustable electrode 29. The plate 42 capacitively couples channels 17 to ground in event of poor electrical contact between the channels 17, the chain links 13 and the I-beams 40 and 41. The high-frequency generator preferably supplies high-frequency electrical energy at a frequency of the order of 1,000,000 cycles per second to 30,000,000 cycles per second, though the particular frequency utilized is not critical and may be of above or below the indicated range.

The channel members 17 provide a grid support for the boards or work 10, that is a support characterized by a plurality of supporting surfaces spaced one from the other lengthwise of the conveyor 11. Similarly, the adjustable electrode 29 is of a grid-like character. It comprises, Fig. 6, a plurality of mechanically interlocked, sliding or telescoping tubular members. In the preferred form of the invention, elements 45, rods or tubes, of smaller diameter alternate lengthwise of the conveyor with tubular elements 46 of larger diameter slidably to receive members 45. The tubular members or elements 45 and 46 together form an array of cylindrical electrode elements disposed in spaced relation along a plane substantially parallel to the channels 17 and the work or boards 10 supported thereon. The elements at one side of the electrode 29, as viewed in Fig. 3, are preferably electrically and mechanically secured to a conducting and supporting member 47 as by screws 48. The conducting member 47 is in turn secured to a plate 49. Similarly, the elements on the opposite side of the electrode 29 are secured to a conducting member 50 as by screws 51, the member 50 being in turn secured to a plate 52. By moving one set of electrode elements toward or away from the other set of electrode elements the effective width of the electrode may be adjusted for the most desirable width with reference to the number of boards or the width of the work 10 to be heated. Further, by alternately disposing the elements 45 and 46, a substantially uniform field is maintained between the electrode 29 and the conveyor 11 for all widths of electrode 29, any effect on the field of the difference of the diameter of the elements 45 and 46 having thus been eliminated. The elements 45 and 46 are mechanically interlocked in sliding relation in the sense that they mutually support each other.

Further in accordance with the present invention, the electrode elements on the lefthand side of the electrode 29, as viewed in Fig. 2, are maintained relatively stationary, and the entire adjustment of the width of electrode 29 is made by adjusting the righthand elements. This is accomplished in connection with the parallel motion links provided for movement of the electrode 29 as a whole to increase and decrease the distance between it and the work 10. From the plates 49 and 52 there extend four sets of insulators respectively numbered 53—56. These insulators serve as means to suspend the electrode 29 from their supporting structures comprising four links 58—61, all four of which fractionally appear in Fig. 6. As best shown in Figs. 1 and 2, it will be observed that each link may be in the form of a turnbuckle for adjustment of its length from a stationary structure 62 which may be a part of the frame, not shown. The links 58—61 are preferably adjusted to be of equal length and to support the electrode 29 in a plane parallel to that of the bedplate or platform formed by conveyor 11 and parallel to the plane of the boards 10 supported thereby. By making the links of equal length, the electrode 29 may be swung as by means of a cord 63 to increase the distance between electrode 29 and the work 10. The links of equal length maintain the electrode parallel to the work 10, and in any position to which it may be swung it remains parallel to any other position thereof. The cord 63 may be of insulating material or it may be of conductive material such as a flexible steel cable or wire. The cord or cable 63 may be wound on a drum 64 either by a motor or by a crank 65, with insulators interposed between it and its coupling member 63-A. It will be seen that the lower ends of the links 58—61 are pivotally connected to rods 66 and 67 which extend through channel members secured to the insulators. Specifically, the strut or rod 66 extends through the channel members 68 and 69 associated with insulators 55 and 53, while the rod 67 extends through the channel members 70 and 71 associated with the insulators 54 and 56. It will be observed, Figs. 2 and 6, that one side of the electrode 29 is anchored in fixed position by collars or locknuts 72 and 73, while the other side thereof is free to slide along the arms of the triangular structure formed by the rods 66 and 67.

Additionally, to prevent lateral movement of the electrode 29 a strut 74, Fig. 2, extends from a point adjacent the upper stationary pivot 75 of the link 58 down to the movable electrode end of the link 60. The upper end of the strut 74 is preferably held in place by means of a pair of locknuts 76, while a similar pair of locknuts 77 secures the lower end to the lower threaded part of the turnbuckle-link 60. A similar strut 78, in like manner, cooperates with the rod 67 to form a second triangular structure to brace the other end of the electrode 29 against lateral movement and preclude transverse swinging of electrode 11. One of the locknuts 79 which secures the lower end of the strut 78 to the electrode end of the link 61 appears in Fig. 1. The upper end of strut 78 is held in fixed position by locknuts 80 on link 59. The arrangement is such that the concurrent pivotal or swinging movement of each link is maintained parallel to the other links and each is restricted to a plane perpendicular to and longitudinal of the plane of the supporting surfaces of the conveyor 11. Conducting member 47 is supported by insulating means 55 and 56 which are at corresponding or like apexes of the two triangular structures formed by the struts and links.

It is to be further understood that the stationary stops 18 as well as the adjustable stops 19 are provided with rounded corners to minimize corona effects and resultant arcing which would tend to occur if metallic structure subjected to the high-frequency field had sharp or pointed edges or projections. In this connection, it will be further observed that the out-turned ends 17-A, Fig. 4, of each of the channels provide a greater area than would be the case if simple U-shaped channels were utilized without the out-turned ends. In other words, the electric field will be more uniform throughout the area of electrode 29 by reason of the outwardly turned projections 17-A on each of the channel members 17.

Further to minimize possibilities of arcing, the pendulantly mounted links 60 and 61 are so located that one side of the electrode 29 is spaced inwardly from the path taken by the stops 18. Similarly, it will be observed in Fig. 2 that the electrode 29 has been so adjusted that the right-hand end of electrode 29 is spaced inwardly from the adjustable stops 19. This spacing need not be very great, preferably of the order of from ½" to 2", but will be adequate to minimize, if not entirely eliminate, arcing between the projecting members. It is to be further understood that for loads of any selected width, the foregoing minimum spacing will be maintained by proper adjustment of the width of electrode 29.

Adjustment of the width of electrode 29 is readily accomplished by an operator who by grasping the conducting member 50 or 52 may slide the elements attached to it into and out of the elements attached to the stationary conducting member 47. By anchoring the stationary member 47 or bracing it against lateral movement, such an operator can make all of the adjustments from one side of the conveyor which, it will be understood, will ordinarily be of substantial length for accommodation of boards of the order of 15 or 20 feet long, or more. By so adjusting the width of the electrode in relation to the width of the work, the high-frequency heating equipment will be more efficiently utilized. The flexibility of operation is greatly increased by reason of the adjustability of electrode 29. By adjusting the electrode area to be very nearly equal to the area of the load, the maximum amount of "circulating current" will pass through the load and a minimum through the air. Thus, the power factor will be higher and the generator will deliver an increased or maximum amount of power to the load. This means higher conveyor speeds for a given rate of heating. Thus, maximum efficiency is realized.

In operation of the high-frequency generator, the electrode 29 serves further important functions. As well understood by those skilled in the art, vacuum tubes, such as the tube 32, when included in oscillator circuits, have greatly shortened lives unless they are protected against excessive internal dissipation of energy which occurs when the tube output is small. In accordance with the present invention, not only is that protection neatly afforded but also means necessary for controlling the loading are provided. More particularly, between the electrode 29 and the work 10 there is an air space. In effect, there are two capacitors in series, one including as the dielectric thereof the aforesaid air space and the other including as the dielectric thereof the load comprising the adhesively coated boards 10. With the oscillator in operation, it will be understood that as the air gap is increased the voltages across these two capacitors vary inversely with their capacitances. The greater the air gap, the greater will be the voltage across it and the less will be the voltage across the load or boards 10.

From the standpoint of the oscillator tube 32, for an increasing air gap the load will decrease and the plate dissipation thereof will rise. Conversely, as the electrode 29 is moved nearer the load 10, the voltage applied to the load increases. The load on the oscillator or high-frequency generator also increases, but so long as the load is within the rating of the tube the plate dissipation will not be excessive. Accordingly, by rotating the crank 65 the electrode 29 may be swung about its pendant links which, while maintaining electrode 29 parallel to the conveyor and the boards 10, move it toward or away from it to increase or decrease the air gap or the spacing therebetween. This adjustment may be made with reference to any suitable load-indicating means, such as an ammeter 81 included in the direct-current anode circuit of tube 32.

It is to be further observed that the foregoing method of controlling the load on the oscillator 32 is highly desirable for the reason that there are no losses in the air gap and thus the adjustment of the electrode 29 toward and away from the work represents an efficient means of adjusting the voltage applied to the glue lines of the boards being heated.

In changing from the gluing or bonding of a lesser number of boards to a larger number of boards, or vice versa, it will be seen that the effective area of the electrode 29 will be increased or decreased. Accordingly, the capacitance between the electrodes connected to the high-frequency generator will change. The corrective adjustment, then necessary, will be made by operation of the crank 65 to change the position of the electrode 29.

Though any suitable high-frequency generator may be utilized, a generator of the type diagrammatically shown in Fig. 1 is preferred for the reason that the frequency-determining circuit, the tank circuit, includes the total capacitance between the electrodes, that of the vacuum condenser 39, and the inductance of the tank inductor 38; that is to say, upon movement of the electrode 29 toward or away from the conveyor 11, the resultant change in capacitance will change the resonant frequency of the tank circuit. However, the excitation of the grid derived directly from the tank circuit, through the inter-electrode capacity, will cause the oscillator to operate at a new frequency. The load-tank-circuit will at all times be resonant to the generator frequency, since it is the frequency-determining circuit of the generator.

The condenser 39 has been described as of the vacuum type and this type of capacitor is preferred for the reason that in one preferred embodiment of the invention the capacitance of the condenser 39 was high, of the order of 100 micromicrofarads, the capacitance between the work electrodes being of the order of 500 micromicrofarads.

While a preferred form of the invention has been described, it is to be understood that further modifications may be made within the scope of the appended claims. For example, the inner sliding members of the electrode 29 may be either tubular or solid. In general, the outer tubes preferably have thin walls. If for large widths of electrode 29, the walls for structural reasons must be of substantial thickness, it will be desirable to bevel the ends of the larger tubes 46 in avoidance of sharp corners. Though cylindrical elements are preferred, a pair of flat conducting sheets, mechanically interlocked and slidable with respect to each other, may be utilized in place of the cylindrical elements 45 and 46. The electrode 29 as a whole may be useful in applications other than with a conveyor of the type described. For example, the conveyor 11, by reason of the plurality of channel members 17, provides a grid-like electrode beneath the grid-like electrode 29. While the conveyor 11 is provided for movement of the boards or work 10 beneath the electrodes during heating, it will be obvious that the adhesive-setting heating operation can be carried out with the work and grid structure of the lower electrode stationary. With the conveyor arranged, Fig. 1, to move work from right to left beneath electrode 29, it will be observed that in the event the electrode 29 is engaged by any work carried by the conveyor, such engagement will cause the electrode to swing about its pivotal mounts. The effect is two-fold. First, it avoids the jamming of the work between the conveyor and the electrode and it simultaneously reduces the intensity of the electric field applied to the work. When the work or boards are progressively moved between the electrodes the conveyor will preferably be provided with means for automatically feeding the boards into and out of it. For example, in Fig. 6 it will be observed that the rollers 26 on the extensions 22–A of each of the racks 22 engage a stationary cam surface 27 which moves the rack 22 and the movable stops 19 to release the spring pressure on the boards. Such a releasing mechanism is preferably actuated at or prior to the time the channel member 17 in moving from right to left starts downward around the sprocket wheel 14, Fig. 1.

A similar cam adjacent the opposite end of the conveyor may be provided to hold the movable clamp in a releasing position until after insertion of the boards and will be so shaped as to permit each spring 23 gradually to move each clamp 19 against the boards. As further shown in Fig. 6, an opposing thrust cam 82 may be provided opposite the cam 27. A roller 83, shown enlarged in Fig. 5, is pivotally carried at the end of each channel member and engages the surface 82 to counteract the thrust developed by the movement of each roller 26 toward the crest of the cam 27.

In the event an arc should occur between one of the transverse elements of the upper electrode 29 and the work 10, the movement therebeneath of the work by the conveyor 11 produces continuous lengthening of the arc until extinguishment thereof. The lower electrode in the form of the invention shown in the drawings comprises the conveyor 11 having the transverse members 17 spaced along and driven by the driving links 13 of the endless chains 12. Since the transverse members 17 move relative to the upper elements of electrode 29, there will be lengthening and extinguishment of any arc which may form between one of the upper transverse elements and one of the moving lower elements, the direction of movement of the latter being in a direction normal to the transverse or longitudinal axes thereof.

What is claimed is:

1. In a high-frequency heating apparatus, the combination of a first electrode having a relatively large area and a second cooperating adjustable electrode of relatively large area extending in parallel relation to said first electrode and comprising a plurality of telescoping outer and inner elements spaced one from the other throughout the length of said second electrode, said outer elements at one side of said electrode alternating with the inner elements with the same regularity as at the opposite side to minimize distortion of said electric field due to the larger diameters of said outer elements, said outer and inner elements being slidable one within the other for adjustment of one dimension of said second electrode to correspond with a similar dimension of work to be subjected to a high-frequency field.

2. An adjustable electrode for cooperation with a stationary electrode of a high-frequency heating apparatus comprising a pair of conducting members spaced one from the other, a stationary support, a plurality of conducting elements spaced one from the other and electrically connected to said members and extending from one of said members to the other, a plurality of links pivoted at corresponding ends respectively to said adjustable electrode and to said stationary support for supporting said adjustable electrode for swinging movement about the pivotal axes of said links, said links being arranged to maintain the plane of said adjustable electrode generally parallel to said stationary electrode when swung relative to said stationary electrode, and means for swinging said adjustable electrode about said pivotal axes bodily to move it lengthwise of said stationary electrode to adjust the spacing between said adjustable electrode and said stationary electrode.

3. An adjustable electrode for cooperation with an adjacent electrode of a high-frequency heating apparatus comprising a pair of conducting members spaced one from the other, electrically conductive elements disposed in mechanically interlocked sliding relation one to the other, said conducting members supporting the outer end portions of said elements, a plurality of pivoted links for supporting said electrode for pivotal movement, said links being arranged to maintain the plane of said electrode generally parallel to said adjacent electrode during pivotal movement thereof, and means for pivotally moving said electrode to adjust the spacing between said adjustable electrode and said adjacent electrode.

4. In a dielectric heating system having a first electrode for work which is to be subjected to a high-frequency electric field, the combination of a second cooperating electrode, means suspending said second electrode above and generally parallel to said first electrode, said means including a plurality of links which cooperate to maintain said second electrode parallel to said first electrode during pivotal movement of said second electrode, said second electrode being made up of a plurality of conducting elements spaced one from the other throughout the length of said second electrode and disposed in sliding relation one to the other for adjustment of the effective area thereof, and means for pivotally moving said second electrode to vary the spacing between said first and second electrode.

5. In a dielectric heating system having a flat platform for the support of work which is to be subjected to a high-frequency electric field, the combination of means including an electrode for applying a high-frequency field to said work, means suspending said electrode above and generally parallel to said platform, said means including pivoted links of substantially equal length for mounting said electrode, means for effecting swinging movement of said electrode to change the spacing between it and said platform while maintaining said electrode substantially parallel to said platform thereby uniformly to change throughout the effective area of said electrode the intensity of the high-frequency electric field applied to the work, said electrode being made up of a plurality of telescoping outer and inner elements spaced one from the other throughout the length of said electrode, said outer elements at one side of said electrode alternating with inner elements with the same regularity as at the opposite side to minimize distortion of said electric field due to the larger diameters of said outer elements, said outer and inner elements being slidable one within the other for adjustment of the effective area of said electrode to correspond with the area of the work to be subjected to said high-frequency field.

6. In a dielectric heating system having a flat platform for the support of work which is to be subjected to a high-frequency electric field, the combination of means including an electrode for applying a high-frequency field to said work, means suspending said electrode above and generally parallel to said platform, said suspending means including pivoted links of substantially equal length for mounting said electrode, means for effecting concurrent swinging movement of said links and of said electrode to change the spacing between it and said platform while maintaining said electrode substantially parallel to said platform thereby uniformly to change throughout the effective area of said electrode the intensity of the high-frequency electric field applied to the work.

7. A dielectric heating system including a bedplate of substantial area for supporting work to be heated and a cooperating, movable electrode comprising a plurality of conducting elements disposed parallel to said bedplate and in spaced relation one to the other, pivoted links mounting said movable electrode above and parallel to said bedplate, and means for bodily swinging both said links and said movable electrode toward and away from said bedplate by rotation of said pivoted links and by lateral movement of said movable electrode to vary the spacing therebetween.

8. A dielectric heating system including a bed for support of work to be heated, a cooperating movable electrode comprising a plurality of conducting elements disposed in a plane above the work and parallel to said bed and in spaced relation one to the other for development between said bed and said electrode of a high-frequency electric field, pivoted links of substantially equal length mounting said movable electrode above and parallel to said bed, and means for swinging said electrode while suspended at the ends of said links to move it laterally of said bed to change the spacing between said electrode and said bed, said links at all times being disposed parallel one to the other to maintain said movable electrode substantially parallel to said bed for uniform change throughout the effective area of said electrode of the intensity of the high-frequency electric field applied to the work.

9. In a dielectric heating system having a conveyor for transporting work through a high-frequency electric field, the combination of a cooperating electrode, means including a plurality of links suspending said electrode above and generally parallel to said conveyor, means for swinging said electrode with said links away from and in the direction of travel of said conveyor, and means forming triangular structures with said links to preclude transverse swinging of said electrode, said electrode being made up of conducting elements disposed in sliding relation one to the other and spaced one from the other throughout the length of said electrode for adjustment of the effective area thereof.

10. In a dielectric heating system having a conveyor for transporting work through a high-frequency field, the combination of a cooperating electrode, means including a plurality of links suspending said electrode above and generally parallel to said conveyor, means for swinging said electrode with said links away from and in the direction of travel of said conveyor, said electrode being made up of conducting elements disposed in sliding relation one to the other and spaced one from the other throughout the length of said electrode for adjustment of the effective area thereof.

11. In a dielectric heating system having a first electrode, the combination of a cooperating movable electrode, means including links each pivotally supported at one end thereof for pendulantly suspending said movable electrode above and generally parallel to said first electrode, means for swinging said movable electrode with said links toward and away from said first electrode to change the spacing therebetween, a strut interconnecting the pivotally supported end of one link and the electrode end of another link to prevent movement thereof in any direction other than pivotal movement in a plane, and a strut interconnecting the electrode ends of said links.

12. In a dielectric heating system having a first electrode for the support of work which is to be subjected to a high-frequency electric field, the combination of a second electrode, means including links supporting said second electrode above and parallel to said first electrode, means for swinging said second electrode with said links toward and away from said first electrode to vary the intensity of the high-frequency electric field therebetween, struts forming triangular shaped structures with said links, and means insulating said second electrode from said links, said second electrode being made up of conducting elements disposed in sliding relation one to the other, a conducting member supported by insulating means associated with like apexes of said triangular structures and supporting one end of each of said sliding members, a conducting member supported by insulating means movable in one direction with respect to said first-named insulating means and supporting the other end of each of said sliding members for adjustment of one dimension of said electrode.

13. In a high-frequency heating system, an electrode having relatively slidable members, a supporting framework for said electrode including pivoted links permitting swinging movement of said electrode about the pivotal axis of said links to an adjusted position, structural members rigidly interconnecting said links to preclude motion of said links transversely of aforesaid swinging movement, and means adjustably attaching said slidable members to said framework to permit their relative sliding movement in a direction transversely of said swinging movement.

14. In a dielectric heating system having a first electrode for the support of work which is to be subjected to a high-frequency electric field, the combination of a second electrode made up of a plurality of conducting elements disposed in telescoping relation one to the other for adjustment of the width thereof, conducting members supporting one end of each of said conducting elements, means including a plurality of links supporting said second electrode above and parallel to said first electrode, struts forming triangular shaped structures with one of said links, insulating means rigidly secured at one apex of said triangular shaped structure and supporting one of said conducting members at one side of said second electrode, and insulating means slidably mounted on a side of said triangular shaped structure supporting the other conducting member at the other side of said second electrode for adjustment of the distance between said conducting elements thereby to change the width of said second electrode.

15. In a dielectric heating system having a grounded electrode for the support of work which is to be subjected to a high-frequency electric field, the combination of a cooperating electrode, suspension means including a plurality of links suspending said electrode above and generally parallel to said grounded electrode, struts forming triangular structures with said links which cooperate to maintain said second electrode parallel to said grounded electrode during pivotal movement of said links, said second electrode being made up of at least two conducting elements disposed in overlapping sliding relation one to the other, said suspension means including means for securing one of said elements to said triangular structures, and means for slidably supporting the other of said elements from at least one arm of said triangular structures for adjustment of one element lengthwise of the other element.

16. In a high-frequency heating system having a conveyor electrode for the support of work to be conveyed through and subjected to a high-frequency electric field and a second electrode disposed in cooperating relation with said conveyor electrode, suspension means pivotally suspending said second electrode for swinging movement toward and away from said conveyor electrode while parallel thereto, means for bodily adjusting the position of said second electrode by swinging it about its pivotal suspension to change its spacing relative to work on said conveyor, said suspension means permitting said second electrode to swing away from said work in the direction of travel of said conveyor electrode in event of engagement by said work during travel between said electrodes to avoid jamming and simultaneously to reduce the intensity of the electric field applied to said work.

17. In a high-frequency heating system, the combination of means including a first electrode and a second electrode spaced therefrom for conveying work between them for application to the work of a high-frequency electric field throughout the travel of the work between said electrodes, suspension means pivotally suspending said second electrode for swinging movement toward and away from said first electrode while parallel thereto, means for bodily adjusting the position of said second electrode by swinging it about its pivotal suspension to change its spacing relative to the work between said electrodes, said suspension means permitting said second electrode to swing away from said work in the direction of travel thereof between said electrodes.

18. In a high-frequency heating system, the combination of a conveyor electrode having a plurality of transverse conducting members spaced one from the other for the support of work to be conveyed thereby, a second electrode spaced from said first electrode and work supported thereby for application to the work of a high-frequency electric field, said second electrode comprising a plurality of transverse conducting elements spaced one from the other, and means for driving said conveyor electrode for movement of work between said electrodes in a direction generally normal to the longitudinal axes of said transverse elements and of said transverse members, said movement lengthening and thereby extinguishing any arcs which form between a moving transverse conducting member and a relatively stationary transverse conducting element.

HENRY R. WARREN.

REFERENCES CITED

The following references are of record in the file of this patent:

UNITED STATES PATENTS

| Number | Name | Date |
|---|---|---|
| 894,070 | Schwerin | July 21, 1908 |
| 1,876,106 | Usselman | Sept. 6, 1932 |
| 1,875,360 | Taylor | Sept. 6, 1932 |
| 1,900,573 | McArthur | Mar. 7, 1933 |
| 1,998,332 | Page | Apr. 16, 1935 |
| 2,288,269 | Crandell | June 30, 1942 |
| 2,317,281 | Linquist | Apr. 30, 1943 |
| 2,319,174 | Wilson | May 11, 1943 |
| 2,428,615 | Brown | Oct. 7, 1947 |
| 2,442,986 | Ransburg | June 8, 1948 |
| 2,457,659 | Graham et al. | Dec. 28, 1948 |
| 2,491,687 | Nutt | Dec. 20, 1949 |
| 2,521,808 | Taylor | Sept. 12, 1950 |

FOREIGN PATENTS

| Number | Country | Date |
|---|---|---|
| 229,416 | Great Britain | Feb. 26, 1925 |

OTHER REFERENCES

Moran et al.: Modern Plastics, June 1944, page 118.